United States Patent
Ghosh et al.

(10) Patent No.: US 12,204,507 B1
(45) Date of Patent: Jan. 21, 2025

(54) SYSTEM AND METHODS FOR DETERMINING PREFERRED DATA SOURCES USING DATA QUALITY SCORES

(71) Applicant: Wells Fargo Bank, N.A., San Francisco, CA (US)

(72) Inventors: Debashis Ghosh, Charlotte, NC (US); Maria Chiarenza, Indian Trail, NC (US); Nathaniel D. Mollison, Edina, MN (US); Matthew C. Howell, Waukee, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/931,409

(22) Filed: Sep. 12, 2022

(51) Int. Cl.
*G06F 16/215* (2019.01)
*G06F 16/25* (2019.01)
*G06Q 40/03* (2023.01)

(52) U.S. Cl.
CPC ............ *G06F 16/215* (2019.01); *G06F 16/25* (2019.01); *G06Q 40/03* (2023.01)

(58) Field of Classification Search
CPC ........ G06F 16/215; G06F 16/25; G06Q 40/03
See application file for complete search history.

(56) References Cited

U.S. PATENT DOCUMENTS

| | | | | |
|---|---|---|---|---|
| 6,411,938 B1 * | 6/2002 | Gates | ............... | G06Q 40/12 705/45 |
| 7,797,211 B1 * | 9/2010 | Reeth, II | ............... | G06Q 40/10 705/35 |
| 8,060,403 B1 | 11/2011 | Grossblatt | | |
| 9,558,521 B1 | 1/2017 | Eftekhari | | |
| 10,025,933 B2 * | 7/2018 | Wadley | ............... | G06F 16/248 |
| 10,942,959 B1 | 3/2021 | Haider | | |
| 11,106,442 B1 | 8/2021 | Hsiao | | |
| 11,640,641 B2 | 5/2023 | Pai | | |
| 11,816,425 B2 | 11/2023 | McArthur | | |
| 12,001,416 B1 | 6/2024 | Cwalina | | |
| 2003/0009418 A1 | 1/2003 | Green et al. | | |
| 2003/0097342 A1 | 5/2003 | Whittingtom | | |
| 2012/0066172 A1 * | 3/2012 | Jebara | ............... | G06N 7/01 706/52 |
| 2012/0158678 A1 * | 6/2012 | McGraw | ............... | G06Q 30/02 707/694 |
| 2013/0317888 A1 * | 11/2013 | Serrano | ............... | G06Q 10/0639 705/7.36 |
| 2015/0025917 A1 * | 1/2015 | Stempora | ............... | G02B 27/0093 705/4 |
| 2016/0371661 A1 * | 12/2016 | Shah | ............... | G06Q 20/3674 |

(Continued)

*Primary Examiner* — Angelica Ruiz
(74) *Attorney, Agent, or Firm* — K&L Gates LLP

(57) ABSTRACT

Systems, apparatuses, methods, and computer program products are disclosed for obtaining data. The data may be obtained from a variety of data sources. In order to determine the preferred data source for obtaining the data, data quality scores may be computed and assigned to each data source of interest for a given implementation. Each data quality score may take into account several criteria including the computing resources required to obtain the data, the financial cost of obtaining the data, the security risk of obtaining the data, etc. Data may be obtained from the preferred data source, presented to a user associated with the data for verification, and processed in order to provide a computer-implemented services to the user.

20 Claims, 10 Drawing Sheets

(56) References Cited

U.S. PATENT DOCUMENTS

| | | |
|---|---|---|
| 2017/0195125 A1* | 7/2017 | Heppe .................. H04L 63/123 |
| 2018/0174127 A1 | 6/2018 | Takasaki |
| 2020/0134714 A1 | 4/2020 | De Gaia et al. |
| 2022/0067828 A1 | 3/2022 | Gross |

* cited by examiner

Credit Application Form

Name:

Annual Income:

List of Monthly Debt Payments:

List of Assets:

Number of Dependents:

FIG. 5A

Credit Application Form

Name: Allison Porter

Annual Income: $75,000

List of Monthly Debt Payments:
Student Loan: $200/month
Car Payment: $300/month

List of Assets: House, Vehicle

Number of Dependents:

FIG. 5B

Credit Application Form

Name: Allison Porter

Annual Income: $75,000 $78,000

List of Monthly Debt Payments:

Student Loan: $200/month
Car Payment: $300/month
Mortgage Payment: $1,500/month

List of Assets: House, Vehicle

Number of Dependents: 1

FIG. 5C

Credit Application Form

Name: Allison Porter

Annual Income: $78,000

List of Monthly Debt Payments:

Student Loan: $200/month
Car Payment: $300/month
Mortgage Payment: $1,500/month

List of Assets: House, Vehicle

Number of Dependents: 1

FIG. 5D

SYSTEM AND METHODS FOR DETERMINING PREFERRED DATA SOURCES USING DATA QUALITY SCORES

BACKGROUND

Modern systems may utilize data to provide services. The data relevant to a particular implementation may exist in a plurality of data sources throughout a distributed system. The data may not be identical across all data sources and this data redundancy may introduce uncertainty when selecting a data source.

BRIEF SUMMARY

Communication systems facilitate a broad array of interactions between devices and users thereof. As part of these interactions, the devices may obtain data from one or more data sources. The data may drive the performance of computer-implemented services based on the data.

In some embodiments, the data may be associated with a user or a collection of users (e.g., a family). User data may be available from a variety of data sources. However, the data may not be consistent across all data sources, as some data sources may be more accurate and/or more recently updated than others. In order to obtain the most accurate and recent data possible, a preferred data source may be selected. A preferred data source may be selected in order to optimize the accuracy of information and the cost (e.g., computational cost, financial cost, security risk cost) of obtaining the data from the data source. The preferred data source may be determined by assigning each data source a data quality score, the data quality score taking into account several criteria for comparison.

Data quality scores may include a computational metric and a security metric. The computational metric may be determined by multiplying the quantity of computing resources required to access the data by a weighting factor. The security metric may be determined by a security ranking for the sources of data, with a higher security ranking indicating a higher level of security and a lower security ranking indicating a lower level of security. Data quality scores may be calculated via other methods without departing from embodiments disclosed herein.

By assigning each data source a data quality score, data sources may be compared based on the computational cost and security risk associated with obtaining data from each data source. Data from data sources may be evaluated using additional criteria including, for example, data recency. Specifically, if data obtained from a data source is older than a previously determined date, the data may be considered out-of-date and may not be considered as viable income data. The previously determined period may be, for example, one year.

When requesting and/or receiving computer-implemented services, users may be required to provide data. In order to streamline the process of requesting and/or receiving computer-implemented services, the data may be obtained from a preferred data source without user intervention as described above. By obtaining the data without user intervention, a cognitive burden on the user may be reduced and data accuracy may be increased, as users may make mistakes when entering the data. Prior to performing the computer-implemented services, the data obtained from the preferred data source many be presented to the user. The user may be able to provide user feedback in order to verify, amend, and/or supplement the data to ensure accuracy of the data. The user feedback may be integrated with the data and used to provide computer-implemented services to the user.

In one example embodiment, a method is provided for obtaining data. The method may include identifying, by a data source management circuitry of an information manager, a data requirement event. The method may also include identifying, by the data source management circuitry, internal sources of data relevant to the data requirement event. The method may also include computing, by the data source management circuitry, a data quality score for the internal sources of the data. The method may also include obtaining, by the data source management circuitry, the data from the entity. The method may also include providing, by a services circuitry of the information manager, computer-implemented services based on the data.

The internal sources of the data may include an employee payroll data repository, a direct deposit data repository, and a self-reported income repository. In a first example, identifying the internal sources of data may include making a determination, by the data source management circuitry, that the data exists in an internal employee payroll data repository; and selecting the internal employee payroll data repository as a preferred internal source of the internal sources of the data.

In a second example, identifying the internal sources of the data may include making a determination, by the data source management circuitry, that the data does not exist in an internal employee payroll data repository; based on the determination, making a second determination, by the data source management circuitry, that the data exists in a direct deposit data repository; and selecting the direct deposit data repository as a preferred internal source of the internal sources of the data.

In a third example, identifying the internal sources of the data may include making a determination, by the data source management circuitry, that the data does not exist in an internal employee payroll data repository; based on the determination, making a second determination, by the data source management circuitry, that the data does not exist in a direct deposit data repository; based on the second determination, making a third determination, by the data source management circuitry, that the data exists in a self-reported income repository; and selecting the self-reported income repository as a preferred internal source of the internal sources of the data.

The data quality score may be based on a computational metric and a security metric.

Computing the data quality score for the internal sources of the data may include: determining, by the data source management circuitry, a quantity of computing resources that will be consumed for obtaining the data from the internal sources of the data; and assigning, by the data source management circuitry, the computational metric based on the quantity of the computing resources. Assigning the computational metric may include multiplying the quantity of the computing resources by a weighting factor.

Computing the data quality score for the internal sources of the data may also include: determining, by the data source management circuitry, a security ranking for the internal sources of the data; and assigning, by the data source management circuitry, the security metric based on the security ranking. The security ranking of the internal sources of the data may be higher than a security ranking of the third-party source.

In a first example, determining where to obtain the data may include: obtaining, by the data source management circuitry, a second data quality score of obtaining the data from a third-party source; making a comparison, by the data source management circuitry, of the second data quality score of obtaining the data from a third-party source to the data quality score for obtaining the data from the internal sources of the data; making a determination, by the data source management circuitry and based on the comparison, that the second data quality score is lower than the data quality score; and selecting, by the data source management circuitry, the third-party source as a preferred data source for obtaining the data.

In a second example, determining where to obtain the data may include: obtaining, by the data source management circuitry, a second data quality score of obtaining the data from a third-party source; making a comparison, by the data source management circuitry, of the second data quality score of obtaining data from a third-party source to the data quality score for obtaining the data from the internal sources of the data; making a determination, by the data source management circuitry and based on the comparison, that the second data quality score is higher than the data quality score; and selecting, by the data source management circuitry, the internal sources of the data as a preferred data source for obtaining the data.

In another example embodiment, an information manager is provided. The information manager includes a data source management circuitry configured to identify a data requirement event. The information manager also includes the data source management circuitry being further configured to identify internal sources of data relevant to the data requirement event. The information manager also includes the data source management circuitry being further configured to compute a data quality score for the internal sources of the data. The information manager also includes the data source management circuitry being further configured to determine an entity from which to obtain the data based on the data quality score and a data quality score for obtaining the data from a third-party source. The information manager also includes the data source management circuitry being further configured to obtain the data from the entity. The information manager also includes a services circuitry configured to provide computer-implemented services based on the data.

In one example embodiment, a method is provided for obtaining data, the method including identifying, by a data source management circuitry of an information manager, a form that solicits user data. The method may also include obtaining, by the data source management circuitry, a subset of the user data without user intervention. The method may also include identifying, by the data source management circuitry, fields of the form. The method may also include populating, by the data source management circuitry, a sub-set of the fields using corresponding sub-sets of the user data. The method may also include presenting, by the data source management circuitry, the populated form to the user. The method may also include obtaining, by an input-output circuitry of the information manager, user feedback via the populated form. The method may also include generating, by the data source management circuitry, a data package based on the user feedback. The method may also include initiating, by the data source management circuitry, processing of the data package to make a determination regarding an application process associated with the form. The method may also include performing, by a services circuitry of the information manager, an action set based on the determination.

The user data may be solicited by the form through input prompt fields, the input prompt fields requesting entry of the user data.

Obtaining the sub-set of the user data may include making a determination, by the data source management circuitry, that the sub-set of the user data exists in a data source of the data sources; and obtaining, by the data source management circuitry, a copy of the sub-set of the user data from the data source. The data sources may include internal data sources and third-party data sources. The user data may include at least one selected from a list consisting of an income of the user, a debt of the user, a liability of the user, an asset of the user, a quantity of dependents of the user, and a location of the user. The determination may be made by inferring a financial status of the user based on the user data.

Populating the sub-set of the fields using corresponding sub-sets of the user data may include making a comparison, by the data source management circuitry, between the sub-sets of the user data and the fields of the form soliciting the user data to identify the sub-set of the fields and modifying, by the data source management circuitry and based on the comparison, the sub-set of the fields based on the corresponding sub-sets of the user data.

Presenting the populated form to the user may include generating, by the data source management circuitry, a graphical user interface based on the populated form, the graphical user interface highlighting the sub-set of the fields and displaying, by the input-output circuitry, the graphical user interface.

Obtaining the user feedback may include obtaining, by the input-output circuitry, the user feedback using the graphical user interface, wherein the user feedback indicates a change to the sub-sets of the user data, and additional data that was not indicated by the populated form.

The data package may include the change to the sub-sets of the user data, the additional data that was not indicated by the populated form, and all of the sub-set of the user data that was not modified by the user via the user feedback.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain embodiments in general terms above, reference will now be made to the accompanying drawings, which are not necessarily drawn to scale. Some embodiments may include fewer or more components than those shown in the figures.

FIGS. 4, 5A, 5B, 5C, and 5D illustrate example operations of a system in accordance with some embodiments described herein.

DETAILED DESCRIPTION

Figure 1:
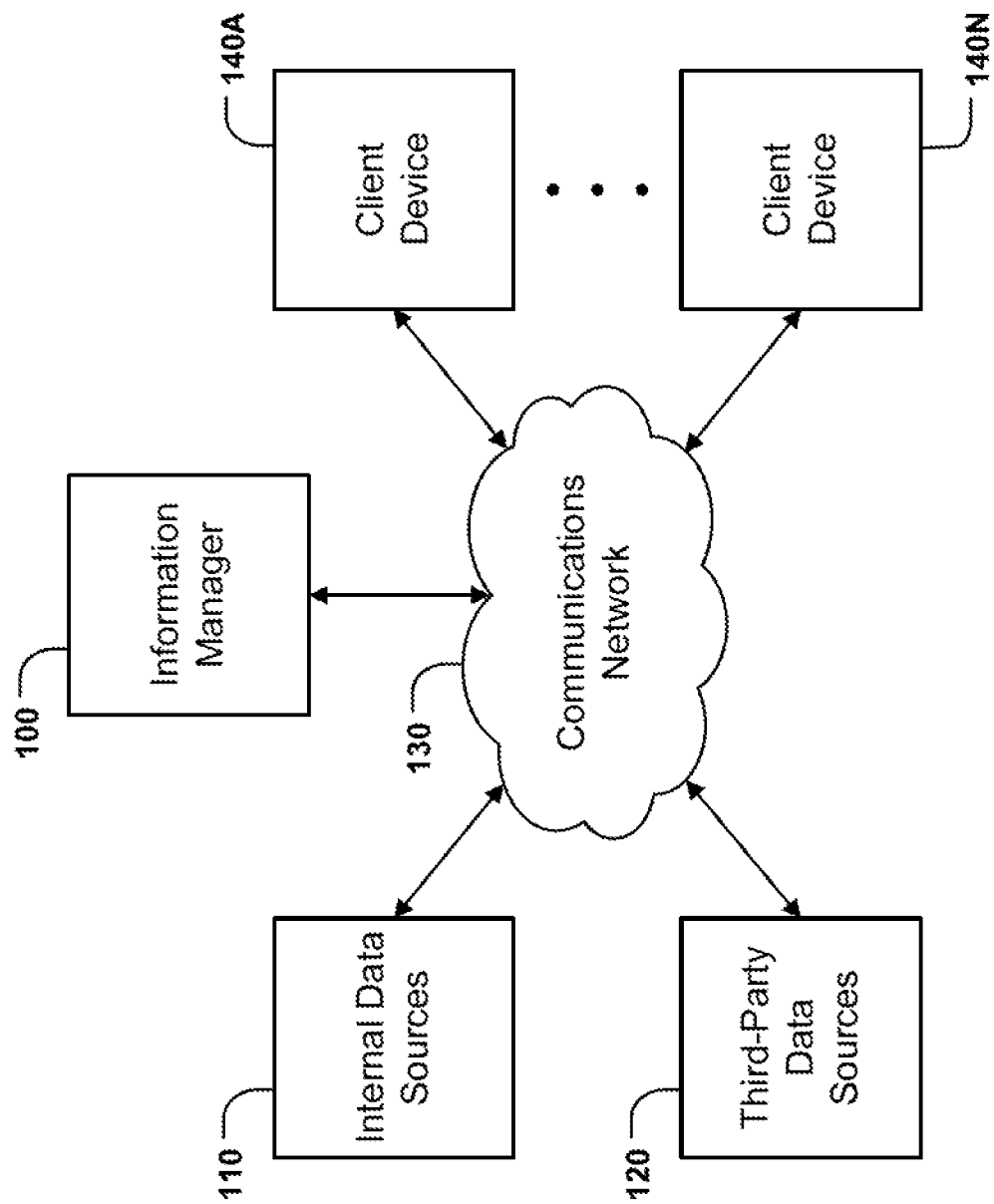
FIG. 1 illustrates a system in which some embodiments may be used for obtaining data from data sources.

Some embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, embodiments described herein provide methods, apparatuses, systems, and computer program products are described herein that provide for determining a preferred data source for obtaining data throughout a distributed system. The distributed system may allow the devices and users to provide and obtain various computer-implemented services including, for example, financial services and/or other types of computer-implemented services. As part of these services, data associated with the user (or the collection of users) of a device may be obtained.

When providing computer-implemented services based on user data, the accuracy of the data may significantly impact the quality of the computer-implemented services. Another consideration when determining a source of data may be the cost associated with obtaining the data. The cost may be a financial cost, a computational cost, a security risk cost, and/or any other type of cost. Obtaining data exclusively from one and/or one type of data source may not be the optimal solution. In order to optimize accuracy and cost, data may be obtained from a variety of data sources depending on the implementation.

Some data sources may be more useful for some implementations and less useful for other implementations. Therefore, different criteria may be taken into account when determining the most useful data source (e.g., the preferred data source) for a given implementation. In order to determine the most useful data source for a given implementation, a data quality score may be computed and assigned for each data source under consideration. The data quality score may take into account the financial cost, computational cost, security risk cost, etc. In addition, data recency may be a factor in determining the usefulness of some data sources. Data older than, for example, one year, may not be considered useful for certain implementations. Data may be obtained from a preferred data source based on the data quality score (and/or other criteria) and the computer-implemented services may be provided based on the data.

For example, a system providing computer-implemented services may be utilized by a bank to provide financial services to banking clients. In order to provide the financial services, the bank may desire to obtain data related to a banking client's income. The bank may have access to income data from a variety of sources including several internal data sources (e.g., data sources operated by the bank and connected to the bank via a secure, shared network). In this example, the banking client's income may exist in two internal data sources (a direct deposit data repository and a self-reported income repository) and a third-party data source. The bank may compare these data sources using data quality scores in order to determine which data source may be the most secure and accurate. In this example, the bank may determine the direct deposit data repository the most secure and accurate option and may obtain the banking client's income from this source. Consequently, the bank may use this income data to make a determination regarding a financial service. For example, the bank may use the banking client's income to determine whether to extend a line of credit to the banking client.

When requesting and/or receiving computer-implemented services, users may be required to provide data. Manual data input by the user may be disadvantageous, as the user may experience a cognitive burden and may make mistakes when inputting the data. In order to streamline the process of requesting and/or receiving computer-implemented services, data may be obtained from a preferred data source without user intervention as described above. By obtaining data without user intervention, errors associated with user entry of data may be minimized and the cognitive burden may be alleviated.

Prior to providing the computer-implemented services, the data obtained from the preferred data source many be presented to the user. The user may be able to provide user feedback in order to verify, amend, and/or supplement the data to ensure accuracy of the data. The user feedback may be integrated with the data and used to provide computer-implemented services to the user.

Continuing with the above example, the bank may obtain data related to a banking client's income from the direct deposit data repository. The bank may provide this data to the banking client in order to verify accuracy of the data. The bank may integrate the banking client's feedback and proceed to provide the financial services based on the updated data.

Although a high-level explanation of the operations of embodiments has been provided above, specific details regarding the configuration of such embodiments are provided below.

System Architecture

Embodiments disclosed herein may be implemented using any number and type of computing devices. To this end, FIG. 1 illustrates an example environment within which various embodiments may operate. As illustrated, the environment may include information manager 100, internal data sources 110, third-party data sources 120, and any number of client devices 140A-140N. These devices may interact with one another to perform any number and types of computer-implemented services. When providing the computer-implemented services, the devices may utilize data associated with a user (or a collection of users) of the client devices 140A-140N, which may be obtained via the internal data sources 110, the third-party data sources 120, and/or other data sources (collectively the "data sources.") In order to provide the services, the devices may determine a preferred data source of the data sources. The devices may determine the preferred data source by assigning a data quality score to each data source of the data sources. Other criteria, including data recency, may be considered as well. The data quality score may be influenced by the cost (e.g., a financial cost, a computational cost, and/or other types of cost) and the security risk associated with obtaining data from the data source.

As used herein, the term information manager refers to a device that obtains data from a variety of data sources, selects a preferred data source from the data sources, and obtains data from the preferred data source in order to provide computer-implemented services to the users of client devices 140A-140N. The term internal data source refers to a device that stores data associated with users of client devices (e.g., client devices 140A-140N). The internal data source may be operated by an organization that also operates the information manager and, therefore, the information manager and internal data source may have access to one or more shared networks. Similarly, the term third-party data source refers to a device that stores data associated with users of client devices (e.g., client devices 140A-140N). The third-party data source may not be operated by the organization that operates the information manager and internal data source. Therefore, the third-party data source may not have access to the one or more shared networks. The term client device refers to a device operated by a user in order to receive computer-implemented services from the information manager. Any device may be an information manager, internal data source, third-party data source and/or client device (for example, a device may both store internal data and determine data quality scores) depending on their role, which may change over time.

The information manager 100 may be implemented using any number (one, many, etc.) and types of computing devices known in the art, such as desktop or laptop computers, tablet devices, smartphones, or the like. The information manager 100 may be associated with corresponding users (e.g., administrators, representatives, other persons, etc.) that use the information manager 100 to obtain data from a preferred data source.

The users and/or applications hosted by the information manager 100 may provide computer-implemented services to the client devices 140A-140N when interacting with them (and/or other devices). In order to provide the computer-implemented services, the information manager 100 may obtain data associated with a user (or a collection of users) of the client devices 140A-140N from internal data sources, third-party data sources, and/or other data sources. The information manager 100 may determine a preferred data source via assigning each data source a data quality score as previously mentioned.

The internal data sources 110 may be implemented using any number and types of computing devices known in the art, such as desktop or laptop computers, tablet devices, smartphones, or the like. The internal data sources 110 may store data associated with users of client devices 140A-140N (and/or other users) and may be operated by an organization that also operates the information manager 100. Therefore, the information manager 100 may access the data stored in the internal data sources 110 via one or more shared networks. By doing so, the information manager 100 may obtain data without incurring a security risk associated with third-party data sources.

For example, the users of the client devices 140A-140N may be banking clients and the internal data sources 110 may be hosted by a bank and include income data gathered via various methods. The internal data sources 110 may include an employee payroll data repository, a direct deposit data repository, a self-reported income repository and/or other data repositories. The employee payroll data repository may include income data associated with employees of the bank sourced from the bank's payroll. The direct deposit data repository may include income data sourced from bank accounts associated with the banking clients. The self-reported income repository may include income data provided by users when participating in or requesting services from the bank (e.g., surveys, loans, credit applications, etc.). The internal data sources 110 may be operated by the same organization as the information manager 100 and, therefore, obtaining data from the internal data sources 110 may pose less of a security risk than obtaining data from third-party data sources 120.

The third-party data sources 120 may be implemented using any number and types of computing devices known in the art, such as desktop or laptop computers, tablet devices, smartphones, or the like. The third-party data sources 120 may store data associated with users of client devices 140A-140N (and/or other users) and the third-party data sources 120 may be hosted by any entity outside the network shared by information manager 100 and internal data sources 110. For example, the information manager 100 may access the data stored in the third-party data sources 120 when the desired data is not available from one of the internal data sources 110. Data may be obtained from the third-party data sources 120 for other reasons and/or under other circumstances without departing from embodiments disclosed herein.

The client devices 140A-140N may be implemented using any number and types of computing devices known in the art, such as desktop or laptop computers, tablet devices, smartphones, or the like. The client devices 140A-140N may provide computer-implemented services and/or receive computer-implemented services from the information manager 100 and/or other devices. The client devices 140A-140N may be associated with corresponding users (e.g., administrators, customers, representatives, other persons, etc.) that use the client devices 140A-140N to interact with the information manager 100 (and/or other devices). The client devices 140A-140N may be independent devices, or may in some embodiments be peripheral devices communicatively coupled to other computing devices. The users and/or applications hosted by the client devices 140A-140N may receive computer-implemented services based on the data obtained by the information manager 100 (and/or other devices).

To facilitate communications, any of the devices shown in FIG. 1 may be operably connected to each other with communications network 130. Communications network 130 may facilitate communications with one or more wired and/or wireless networks implemented using any suitable communications technology. In an embodiment, the communications network 130 may include multiple networks, some of which may be shared by one or more devices throughout the distributed system. For example, the information manager 100 and the internal data sources 110 may be hosted by the same organization and, therefore, may operate on a shared network. This shared network may facilitate secure transmissions of data between information manager 100 and internal data sources 110.

Although FIG. 1 illustrates an environment and implementation in which various functionalities are performed by different devices, in some embodiments some or all of the functionalities of the information manager 100, internal data sources 110, third-party data sources 120, and client devices 140A-140N may be aggregated into a single device.

Example Implementing Apparatuses

Figure 2:
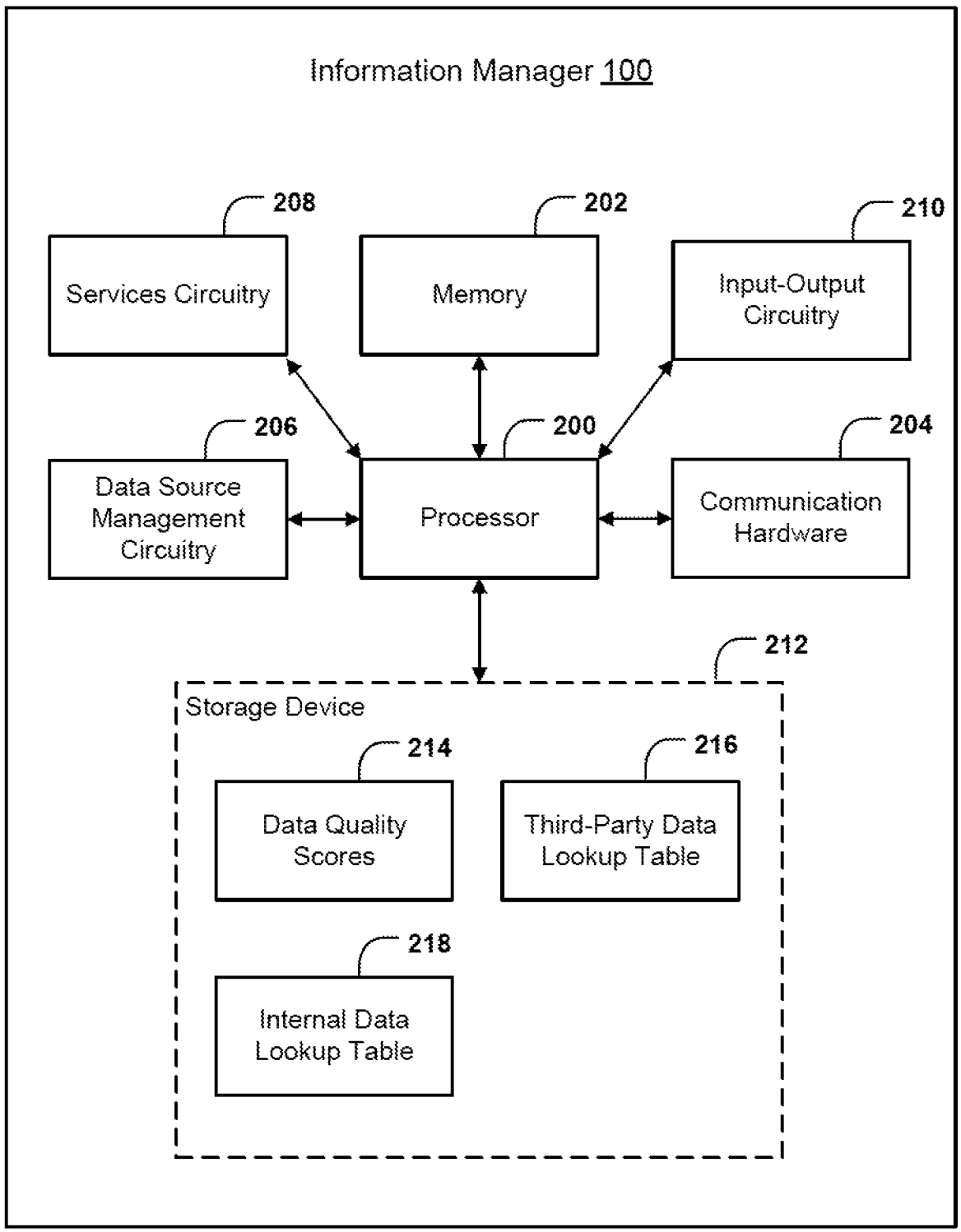
FIG. 2 illustrates a schematic block diagram of example circuitry embodying an information manager that may perform various operations in accordance with some embodiments described herein.

Turning to FIG. 2, the information manager 100 may be embodied by one or more computing devices or servers, shown in FIG. 2. As illustrated in FIG. 2, the information manager 100 may include processor 200, memory 202, communication hardware 204, data source management circuitry 206, services circuitry 208, input-output circuitry 210, and storage device 212, each of which will be described in greater detail below. While the various components are only illustrated in FIG. 2 as being connected with processor 200, it will be understood that the information manager 100 may further comprise a bus (not expressly shown in FIG. 2) for passing information amongst any combination of the various components of the information manager 100. The information manager 100 may be configured to execute various operations described above in connection with FIG. 1 and below in connection with FIGS. 3A-5D.

The processor 200 (and/or co-processor or any other processor assisting or otherwise associated with the processor) may be in communication with the memory 202 via a bus for passing information amongst components of the apparatus. The processor 200 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the information manager 100, remote or "cloud" processors, or any combination thereof.

The processor 200 may be configured to execute software instructions stored in the memory 202 or otherwise accessible to the processor (e.g., software instructions stored on a separate or integrated storage device 212). In some cases, the processor may be configured to execute hard-coded functionality. As such, whether configured by hardware or software methods, or by any combination of hardware with software, the processor 200 represents an entity (e.g., physically embodied in circuitry) capable of performing operations according to various embodiments of the present invention while configured accordingly. Alternatively, as another example, when the processor 200 is embodied as an executor of software instructions, the software instructions may specifically configure the processor 200 to perform the algorithms and/or operations described herein when the software instructions are executed.

Memory 202 is non-transitory and may include, for example, one or more volatile and/or non-volatile memories. In other words, for example, the memory 202 may be an electronic storage device (e.g., a computer readable storage medium). The memory 202 may be configured to store information, data, content, applications, software instructions, or the like, for enabling the apparatus to carry out various functions in accordance with embodiments described herein.

The communication hardware 204 may be any means such as a device or circuitry embodied in either hardware or a combination of hardware and software that is configured to receive and/or transmit data from/to a network and/or any other device, circuitry, or module in communication with the information manager 100. In this regard, the communication hardware 204 may include, for example, a network interface for enabling communications with a wired or wireless communication network. For example, the communication hardware 204 may include one or more network interface cards, antennas, buses, switches, routers, modems, and supporting hardware and/or software, or any other device suitable for enabling communications via a network. Furthermore, the communication hardware 204 may include a processing circuitry for causing transmission of such signals to a network or for handling receipt of signals received from a network.

In addition, information manager 100 further comprises data source management circuitry 206 configured to determine a preferred data source for a given implementation from a set of data sources. The data source management circuitry 206 may determine a list of internal data sources relevant to a data requirement event and assign each data source a data quality score, which may be stored in data quality scores 214. Data source management circuitry 206 may utilize the data quality scores to determine a preferred data source and obtain data from the preferred data source. Data source management circuitry 206 may utilize processor 200, memory 202, or any other hardware component included in the information manager 100 to perform these operations, as described in connection with FIGS. 3A-5D below. The data source management circuitry 206 may further utilize communication hardware 204 to obtain data from a variety of sources (e.g., internal data sources 110, third-party data sources 120, and/or other data sources as shown in FIG. 1) and in some embodiments may utilize processor 200 and/or memory 202 to determine the preferred data source and obtain data from the preferred data source.

In addition, information manager 100 further comprises input-output circuitry 210 configured to interact directly with users of devices (e.g., client devices 140A-140N). The input-output circuitry 210 may interact with users by managing a graphical user interface presented to the user, the graphical user interface allowing the user to verify, amend, and/or supplement data presented to the user. Input-output circuitry 210 may utilize processor 200, memory 202, or any other hardware component included in the information manager 100 to perform these operations as described in connection with FIGS. 3A-5D below. The input-output circuitry may further utilize communication hardware 204 to gather user input from devices (e.g., client devices 140A-140N) and may utilize processor 200 and/or memory 202 to generate and populate the graphical user interface.

In addition, information manager 100 further comprises services circuitry 208 configured to provide any number of computer-implemented services in isolation or in cooperation with other devices operably connected to information manager 100. Services circuitry 208 may utilize processor 200, memory 202, or any other hardware component included in the information manager 100 to perform these operations, as described in connection with FIGS. 3A-5D below. The services circuitry 208 may further utilize communication hardware 204 to communicate with users of client devices (e.g., client devices 140A-140N) prior to, during, and/or after providing the computer-implemented services and in some embodiments may utilize processor 200 and/or memory 202 to facilitate providing the computer-implemented services.

Finally, information manager 100 may include storage device 212 that stores data structures used by the data source management circuitry 206 to perform its functionality. Storage device 212 may be a non-transitory storage and include any number and types of physical storage devices (e.g., hard disk drives, tape drives, solid state storage devices, etc.) and/or control circuitry (e.g., disk controllers usable to operate the physical storage devices and/or provide storage functionality such as redundancy, deduplication, etc.). Storage device 212 may include data quality scores 214, third-party data lookup table 216, internal data lookup table 218, and/or other data structures as described below.

Data quality scores 214 may include data quality scores used to determine a preferred data source for a given data requirement event. Data quality scores may be assigned to various data sources (e.g., internal data sources 110, third-party data sources 120, and/or other data sources) by information manager 100. The data quality scores may be based on a computational metric and a security metric. The computational metric may be determined by multiplying the quantity of computing resources required to access the data by a weighting factor. The security metric may be determined by a security ranking for the sources of data, with a higher security ranking indicating a higher level of security and a lower security ranking indicating a lower level of security.

In an embodiment, the internal data sources 110 may include an employee payroll data repository, a direct deposit data repository, and a self-reported income repository, as previously described with relation to FIG. 1. Obtaining data from the employee payroll data repository may consume 300 units of computing resources. In addition, the employee payroll data repository may be considered a low-risk data source and, therefore, may have a security ranking of 5 (on a scale of 1 to 5 with 1 being the least secure and 5 being the most secure).

The data quality score associated with the employee payroll data repository may be calculated using the following formula: data quality score=(quantity of computing resources)*(weighting factor)+security ranking. In order to calculate the data quality score, the quantity of computing resources may be multiplied by a weighting factor of 0.01 to yield a computational metric of 3. The data quality score may be calculated by adding the computational metric and the security ranking, which may result in a data quality score of 8 for the employee payroll data repository.

In contrast, obtaining data from the self-reported income data repository may consume 250 units of computing resources and, therefore, may have a computational metric of 2.5. However, the self-reported income data repository may have a security ranking of 3 and, therefore, a data quality score of 5.5. In this example, the information manager 100 may select the employee payroll data repository as the preferred data source for the given implementation (assuming a higher data quality score is a preferred data quality score). Data quality scores may be calculated via other methods and considering other parameters without departing from embodiments disclosed herein. Data quality scores 214 may be implemented using any number and types of data structures (e.g., database, lists, tables, linked lists, etc.).

Third-party data lookup table 216 may include a lookup table used to determine the cost to obtain data associated with a user (e.g., a user of client devices 140A-140N) from a third-party source. The cost may include a financial cost, a computing resources cost, and/or other types of cost. The third-party data lookup table 216 may include information regarding any number of third-party data sources. The cost to obtain data may be used by the information manager 100 at least in part to determine a data quality score for third-party data sources 120.

In an embodiment, data quality scores may be determined for third-party sources based on a financial cost of obtaining the data from the third-party source. For example, the cost of obtaining a client's income from a third party may be $3.00. In order to obtain a computational metric for the data source, the information manager may convert the financial cost to a computational cost via a conversion factor of $0.01/unit of computing resources. Therefore, the computational metric for the third-party source may be 300 units of computing resources. The security ranking of a third-party data source may be lower than an internal data source, as there may be increased risks associated with obtaining sensitive user data from a source outside the entity that hosts the information manager 100. Therefore, the security ranking of the third party source may be 1 (on a scale of 1 to 5 with 1 being the lease secure and 5 being the most secure). Consequently, the data quality score for the third-party data source may be determined by multiplying the computing resources by the weighting factor of 0.01 and adding the security ranking. This formula results in a data quality score of 4 for the third-party source. Data quality scores for third-party data sources may be calculated via other methods and considering other parameters without departing from embodiments disclosed herein. Third-party data lookup table 216 may be implemented using any number and types of data structures (e.g., database, lists, tables, linked lists, etc.).

Internal data lookup table 218 may include a lookup table used to determine the cost to obtain data associated with a user (e.g., a user of client devices 140A-140N) from internal data sources 110. The cost may include a financial cost, a computing resources cost, and/or other types of cost. The internal data lookup table 218 may include information regarding any number of internal data sources. The cost to obtain the data may be used by the information manager 100 at least in part to determine a data quality score for internal data sources 110. For example, internal data lookup table 218 may indicate the quantity of computing resources required to obtain data from an internal data source. This quantity of computing resources may be used at least in part to determine the data quality score of the internal data source as described above. Internal data lookup table 218 may be implemented using any number and types of data structures (e.g., database, lists, tables, linked lists, etc.).

While illustrated in FIG. 2 as being a part of information manager 100, the data quality scores 214, third-party data lookup table 216, and internal data lookup table 218 may be stored (partially or entirely) in a different device operably connected to information manager 100.

Although components 200-218 are described in part using functional language, it will be understood that the particular implementations necessarily include the use of particular hardware. It should also be understood that certain of these components 200-218 may include similar or common hardware. For example, the data source management circuitry 206 and services circuitry 208 may each at times leverage use of the processor 200, memory 202, communication hardware 204, and/or storage device 212, such that duplicate hardware is not required to facilitate operation of these physical elements of the information manager 100 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the information manager 100 to perform the various functions described herein.

Although data source management circuitry 206 and services circuitry 208 may leverage processor 200 or memory 202 as escribed above, it will be understood that any of these elements of information manager 100 may include one or more dedicated processor, specially configured field programmable gate array (FPGA), or application specific interface circuit (ASIC) to perform its corresponding functions, and may accordingly leverage processor 200 executing software stored in memory 202, or communication hardware 204 for enabling any functions not performed by special-purpose hardware elements. In all embodiments, however, it will be understood that the data source management circuitry 206 and the services circuitry 208 are implemented via particular machinery designed for performing the functions described herein in connection with such elements of information manager 100.

In some embodiments, various components of the information manager 100 may be hosted remotely (e.g., by one or more cloud servers) and thus need not physically reside on the corresponding information manager 100. Thus, some or all of the functionality described herein may be provided by third-party circuitry. For example, a given information manager 100 may access one or more third-party circuitries via any sort of networked connection that facilitates transmission of data and electronic information between the information manager 100 and the third-party circuitries. In turn, that information manager 100 may be in remote communication with one or more of the other components described above as comprising the information manager 100.

As will be appreciated based on this disclosure, embodiments described herein may be implemented by an information manager 100. Furthermore, some embodiments may take the form of a computer program product comprising software instructions stored on at least one non-transitory computer-readable storage medium (e.g., memory 202). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by information manager 100 as described in FIG. 2, that loading the software instructions onto a computing device or apparatus produces a special-purpose machine comprising the means for implementing various functions described herein.

Example Apparatus Operations for Obtaining Data

Figure 3A:
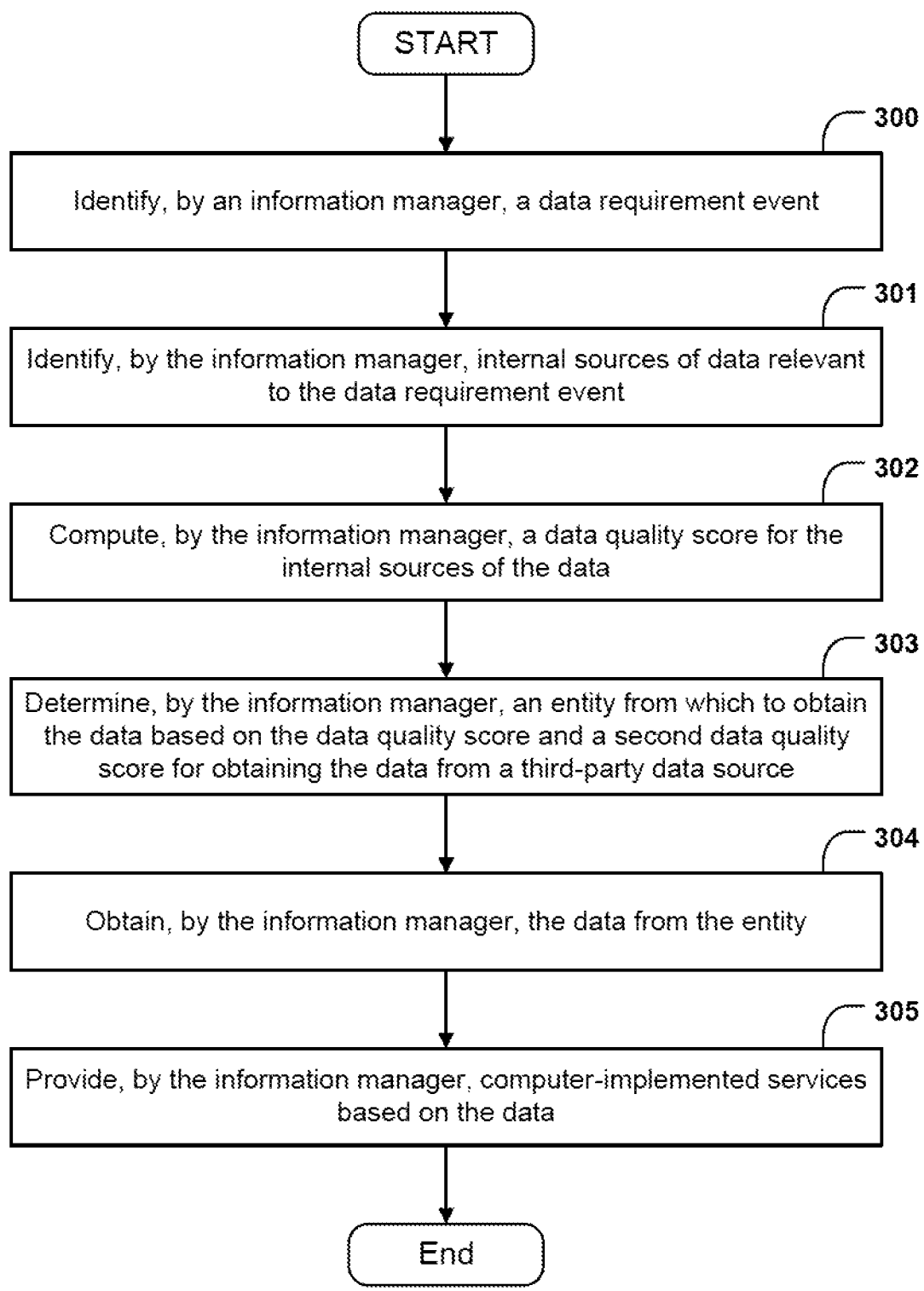
FIG. 3A illustrates an example flowchart for obtaining data from a preferred data source in accordance with some embodiments described herein.
Figure 3B:
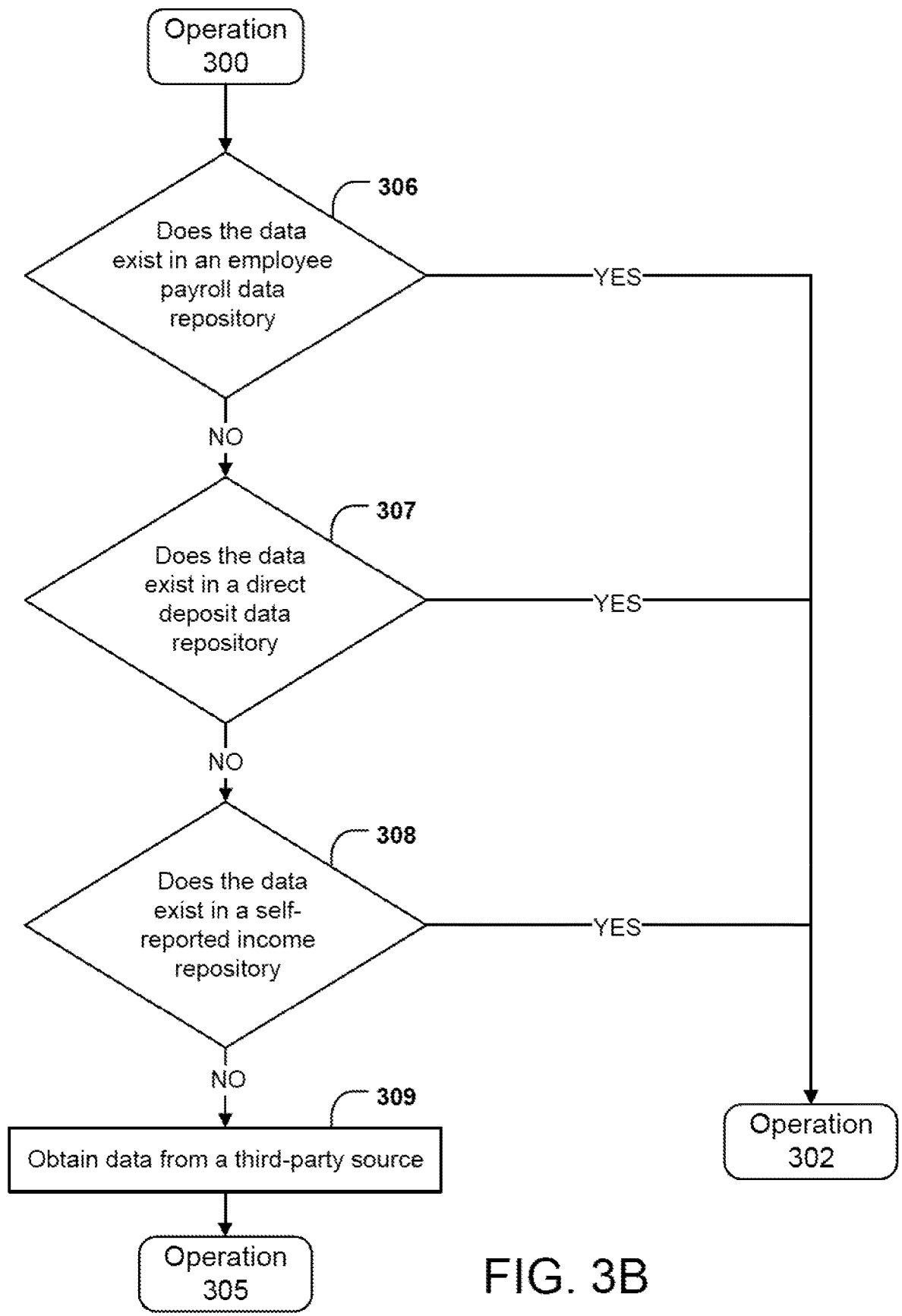
FIG. 3B illustrates an example flowchart for determining which internal sources of data may store the desired data for a given implementation in accordance with some embodiments described herein.
Figure 3C:
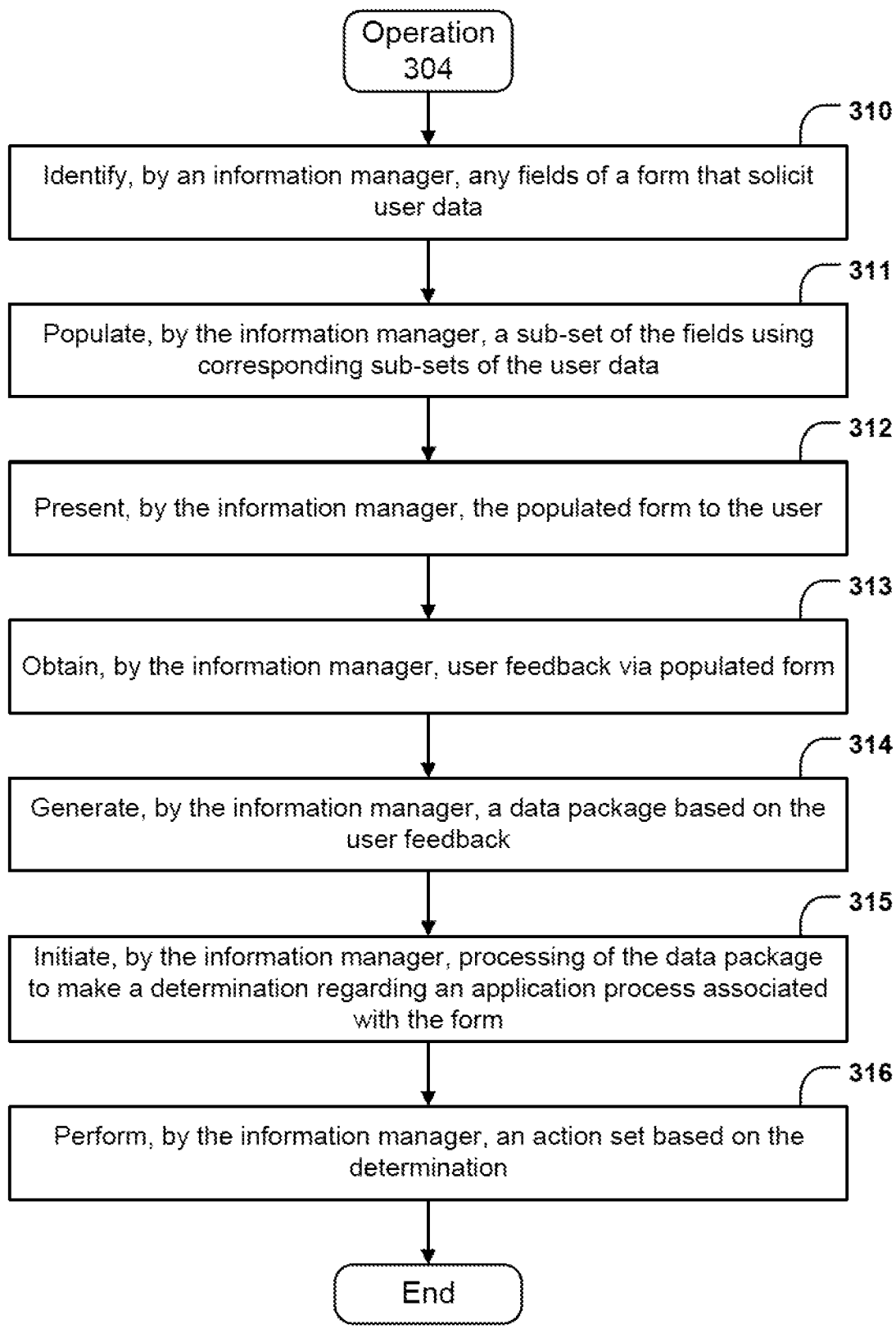
FIG. 3C illustrates an example flowchart for providing computer-implemented services to a user of a client device in accordance with some embodiments described herein.

Turning to FIGS. 3A-3C, example flowcharts are illustrated that include example operations implemented by various embodiments described herein. FIGS. 3A-3C illustrate example operations for providing computer-implemented services based on data obtained from a preferred data source.

The operations illustrated in FIGS. 3A-3C may, for example, be performed by information manager 100 shown in FIG. 1, and which is also shown and described in connection with FIG. 2. To perform the operations described below, the information manager 100 may utilize one or more of processor 200, memory 202, communication hardware 204, data source management circuitry 206, services circuitry 208, input-output circuitry 210, storage device 212, and/or any combination thereof.

Turning first to FIG. 3A, example operations are shown for obtaining data from a preferred data source. Prior to obtaining the data, information manager 100 may determine a preferred data source by assigning a data quality score to any number of data sources. The data quality score may indicate the computational cost and/or security risk associated with obtaining the data from a particular data source as described with relation to FIG. 2.

As shown by operation 300, information manager 100 includes means, such as a processor, memory, and a communication hardware, or the like, for identifying a data requirement event. The data requirement event may be identified by receiving a request for computer-implemented services from a client device (e.g., client device 140A). For example, a user of client device 140A may request computer-implemented services by submitting a request for a new line of credit from a bank. In this example, identifying a data requirement event may include an authentication process in order to confirm the identity of the user requesting the computer-implemented service. The authentication process may include a single-factor or multi-factor authentication process and may involve a password, pin, biometric factor, and/or other factor.

In an embodiment, the information manager 100 may identify a data requirement event without receiving a request from another device throughout the distributed system. For example, the information manager 100 may require data in order to update, renew, and/or suggest a computer-implemented service for a user of a client device (e.g., client device 140A). The data requirement event may be other events without departing from embodiments disclosed herein.

As shown by operation 301, information manager 100 includes means, such as a processor, memory, and a data source management circuitry, or the like, for identifying internal sources of data relevant to the data requirement event. Internal sources of data (e.g., internal data sources 110) may be hosted by the same entity (and, therefore, on a shared, secure network with) the information manager 100. The internal data sources 110 may store income data associated with users of client devices 140A-140N and may include an employee payroll data repository, a direct deposit data repository, a self-reported income data repository, and/or other data repositories.

In an embodiment, the information manager 100 may identify internal sources of the data relevant to the data requirement event by sending a request to the internal data sources 110 to determine which of the internal data sources 110 may store the desired data. For example, the information manager 100 may transmit a request for income data related to a user of a client device 140A. The response from the internal data sources 110 may include a list of the internal data sources that store the income data associated with the user. The list may also take a data recency requirement into account (e.g., the list may not include data sources with income data older than one year). The list may include a direct deposit data repository and a self-reported income repository.

In an embodiment, information manager 100 may identify internal sources of the data relevant to the data requirement event using a prioritized system of requests. For example, the information manager 100 may rank the internal sources of the data based on accuracy and accessibility of data for a given implementation and may send individualized requests to the internal data sources 110 in order of the ranking. For additional information regarding identifying internal sources of the data, refer to FIG. 3B.

As shown by operation 302, information manager 100 includes means, such as a processor, memory, and a data source management circuitry, or the like, for computing a data quality score for the internal sources of the data. Data quality scores may be used to determine a preferred data source of the internal data sources 110 for obtaining data. Data quality scores may include a computational metric (a representation of the quantity of computing resources needed to obtain the data) and a security metric (a representation of the security risk associated with obtaining the data). For additional details regarding data quality scores, refer to FIG. 2. Data quality scores may be computed by the information manager 100 using internal data lookup table 218 to determine the quantity of computing resources consumed and security ranking for each of the internal data sources 110. Alternatively, data quality scores may be computed by another entity (e.g., a second information manager) and obtained by information manager 100 as part of operation 302. Data quality scores may be computed and obtained via other methods without departing from embodiments disclosed herein.

As shown by operation 303, information manager 100 includes means, such as a processor, memory, and a data source management circuitry, or the like, for determining an entity from which to obtain the data based on the data quality score and a data quality score for obtaining the data from a third-party source. Data quality scores may be computed for internal data sources 110 as described above and in further detail with reference to FIG. 2. Data quality scores may be computed for third-party sources using similar parameters (e.g., a computational metric and a security ranking). There may be a financial cost associated with obtaining data from a third-party source, and the financial cost may be integrated into the computational metric as described with reference to FIG. 2.

For example, the information manager 100 may obtain the following data quality scores: (direct deposit data repository: 6, self-reported data repository: 5, third-party source: 3). In this example, a higher data quality score may indicate a preferred data source and the information manager 100 may determine the direct deposit data repository as the preferred source for obtaining the desired data. Data quality scores may be represented in other ways and rankings may be determined via other methods without departing from embodiments disclosed herein.

As shown by operation 304, information manager 100 includes means, such as a processor, memory, and communication hardware, or the like, for obtaining the data from the entity. The information manager 100 may determine the preferred source of data and send an individualized request to that data source for the data. Alternatively, the information manager 100 may transmit a data quality score ranking (e.g., direct deposit data repository: 6, self-reported data repository: 5, third-party source: 3) to another entity (e.g., a data quality score manager) and the data quality score manager (not shown) may obtain the data based on the data quality score ranking. The data quality score manager may then transmit the data to the information manager 100.

As shown by operation 305, information manager 100 includes means, such as a processor, memory, and a services circuitry, or the like, for providing computer-implemented services based on the data. The computer-implemented services may be provided using the data by performing actions based on the content of the data. For example, the data may be stored in memory, used to obtain other information (e.g., via computation), may be used to control programmatic flow of applications, and/or may be otherwise used by applications or other entities that provide the computer-implemented services.

The computer-implemented services may include, for example, providing financial services to at least one of the users of client devices 140A-140N and extending a financial product offer to at least one of the users of the client devices 140A-140N based on the data. The financial services may be extending a new line of credit, offering a loan, etc.

The method may end following operation 305.

Turning to FIG. 3B, example operations are shown for determining which internal sources of data may store the desired data for a given implementation. For example, the internal data sources 110 may include an employee payroll data repository, a direct deposit data repository, and a self-reported data repository. The information manager 100 may identify which internal data sources store the relevant data as described below. The operations shown in FIG. 3B may be an expansion of operation 301 in FIG. 3A.

As shown by operation 306, information manager 100 includes means, such as a processor, memory, and a data source management circuitry, or the like, for determining whether the data exists in an employee payroll data repository. For example, the information manager 100 may be hosted by a bank and the employee payroll data repository may include income data associated with employees of the bank. This data may be considered both accurate and secure, as the bank may have the most updated information regarding the payroll of its employees and the information manager 100 may be able to obtain the data via a secure internal network.

In an embodiment, if the data exists in the employee payroll data repository, the method may proceed to operation 302. In this example, the information manager 100 may determine that the employee payroll data repository may be the preferred choice for obtaining income data and, therefore, may not need to solicit income data from the direct deposit data repository and the self-reported income repository. If the data does not exist in the employee payroll data repository, the method may proceed to operation 307. In a second example, the information manager 100 may solicit income data from each of the internal data sources 110 prior to proceeding to operation 302.

As shown by operation 307, information manager 100 includes means, such as a processor, memory, and a data source management circuitry, or the like, for determining whether the data exists in a direct deposit data repository. For example, the information manager 100 may be hosted by a bank and the direct deposit data repository may include income data obtained from user's bank accounts. The direct deposit data repository may be considered accurate and secure, although potentially less accurate than the employee payroll data as the data does not come from the bank itself. Obtaining data from the direct deposit data repository may pose a low security risk, as the information manager 100 may be able to obtain the data via a shared internal network.

In an embodiment, if the data exists in the direct deposit data repository, the method may proceed to operation 302. In this example, the information manager 100 may determine that the direct deposit data repository may be the preferred choice for obtaining income data and, therefore, may not need to solicit income data from the self-reported income repository. If the data does not exist in the direct deposit data repository, the method may proceed to operation 308. In a second example, the information manager 100 may solicit income data from each of the internal data sources 110 prior to proceeding to operation 302.

As shown by operation 308, information manager 100 includes means, such as a processor, memory, and a data source management circuitry, or the like, for determining whether the data exists in a self-reported income repository. For example, the information manager 100 may be hosted by a bank and the self-reported income repository may include income data submitted by a user of at least one of client devices 140A-140N as part of a customer survey, application for financial services, and/or other self-reported sources. The self-reported income repository may be considered less accurate than the employee payroll data repository and the direct deposit data repository, as the data has been submitted by a user and has not been verified by another source. Obtaining data from the self-reported income repository may pose a low security risk, as the information manager 100 may be able to obtain the data via a shared internal network.

In an embodiment, if the data exists in the self-reported income repository, the method may proceed to operation 302. In this example, the information manager 100 may determine that the self-reported income repository may be the preferred choice for obtaining income data. If the data does not exist in a direct deposit data repository, the method may proceed to operation 309. In a second example, the information manager 100 may solicit income data from each of the internal data sources 110 prior to proceeding to operation 302.

As shown by operation 309, information manager 100 includes means, such as a processor, memory, and a data source management circuitry, or the like, for obtaining the data from a third-party source. Continuing with the above example, the third-party source may be another entity (e.g., an income verification service) utilized by the bank to obtain income data associated with users of client devices 140A-140N. In a first example, the information manager 100 may obtain data from a third-party source when no data is available from internal data sources. In a second example, the information manager 100 may obtain data from a third-party source for other reasons (e.g., to minimize consumption of computing resources). The information manager 100 may obtain data from third-party sources for other reasons without departing from embodiments disclosed herein. Obtaining data from a third-party source may pose a higher security risk than obtaining data from internal data sources, as the information manager 100 may not be able to obtain the data via a shared internal network.

The method may proceed to operation 305.

Turning to FIG. 3C, example operations are shown for providing computer-implemented services to a user of a client device (e.g., client device 140A). In this example embodiment, the computer-implemented services may include pre-populating a form associated with a computer-implemented service using data obtained via the operations shown in FIG. 3A. The operations shown in FIG. 3C may be an expansion of operation 305 in FIG. 3A. Therefore, in this example, the information manager 100 may have previously authenticated the user of the client device (e.g., client device 140A), obtained a request from the user to provide a computer-implemented service, obtained data associated with the user via the method described in FIGS. 3A-3B, and obtained a form associated with the requested computer-implemented service.

As shown by operation 310, information manager 100 includes means, such as a processor, memory, and a data source management circuitry, or the like, for identifying any fields of a form that solicit user data. The form may include an application for a line of credit and the fields of the form may solicit user data including the name, income, debt payments, assets, and number of dependents associated with the user.

As shown by operation 311, information manager 100 includes means, such as a processor, memory, and a data source management circuitry, or the like, for populating a sub-set of the fields using corresponding sub-sets of the user data. The sub-set of user data may be obtained from internal data sources and/or third-party data sources. The sub-set of user data may be obtained without user intervention via the methods described in FIGS. 3A-3C. Information manager 100 may make a comparison between the available sub-set of user data and the fields of the form to determine the sub-set of the fields. The information manager 100 may modify the sub-set of the fields based on the corresponding sub-sets of the user data.

In an embodiment, the information manager 100 may obtain the populated form (e.g., with a sub-set of the fields modified using the corresponding sub-set of the user data) from another entity (e.g., a second information manager) responsible for managing the sub-set of data.

As shown by operation 312, information manager 100 includes means, such as a processor, memory, and a data source management circuitry, or the like, for presenting the populated form to the user. In order to present the form to the user, the information manager 100 may generate a graphical user interface based on the populated form. The graphical user interface may highlight the sub-set of the fields and display the graphical user interface to the user. The sub-set of the fields may be highlighted by the information manager 100 in order to draw the attention of the user to the fields of the form that may have been modified based on user data without user intervention.

As shown by operation 313, information manager 100 includes means, such as a processor, memory, and input-output circuitry, or the like, for obtaining user feedback via the populated form. The user feedback may indicate a change to the sub-sets of the user data and additional data that was not indicated by the populated form. For example, the user may provide feedback by editing the sub-set of the fields that was pre-populated by the information manager 100 in order to ensure accuracy of the pre-populated user data. In addition, the user may provide additional data in order to complete any empty fields of the form.

As shown by operation 314, information manager 100 includes means, such as a processor, memory, a data source management circuitry, or the like, for generating a data package based on the user feedback. The data package may include the change to the sub-sets of the user data, the additional data that was not indicated by the populated form, and all of the sub-set of the user data that was not modified by the user via the user feedback. For additional details and an example regarding obtaining data packages, refer to FIGS. 5A-5D.

As shown by operation 315, information manager 100 includes means, such as a processor, memory, a data source management circuitry, or the like, for initiating processing of the data package to make a determination regarding an application process associated with the form. Processing the data package may include feeding the data package into an algorithm designed to make a determination regarding a computer-implemented service given a set of user data. For example, the data package may include a credit application and the user data in the application may include the name of the user, the income of the user, the debt associated with the user, the liabilities associated with the user, the quantity of dependents associated with a user, a location of a user, etc. This user data may be, for example, fed into an inference model trained to make a determination regarding whether to extend a line of credit based on the user data. Data packages may be processed via other methods without departing from embodiments disclosed herein.

As shown by operation 316, information manager 100 includes means, such as a processor, memory, a services circuitry, or the like, for performing an action set based on the determination. The action set may include, for example, providing or denying a computer-implemented service based on the previously described determination. Continuing with the above example, the action set may include extending a line of credit to the user of the client device (e.g., client device 140A) based on the user data provided in the form. The action set may include other actions without departing from embodiments disclosed herein.

The method may end following operation 316.

FIGS. 3A-3C illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on a computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional operations may be included. Modifications, amplifications, or additional optional operations may be included. Modifications, amplifications, or additions to the operations above may be performed in any order and in any combination.

Example System Operations

Figure 4:
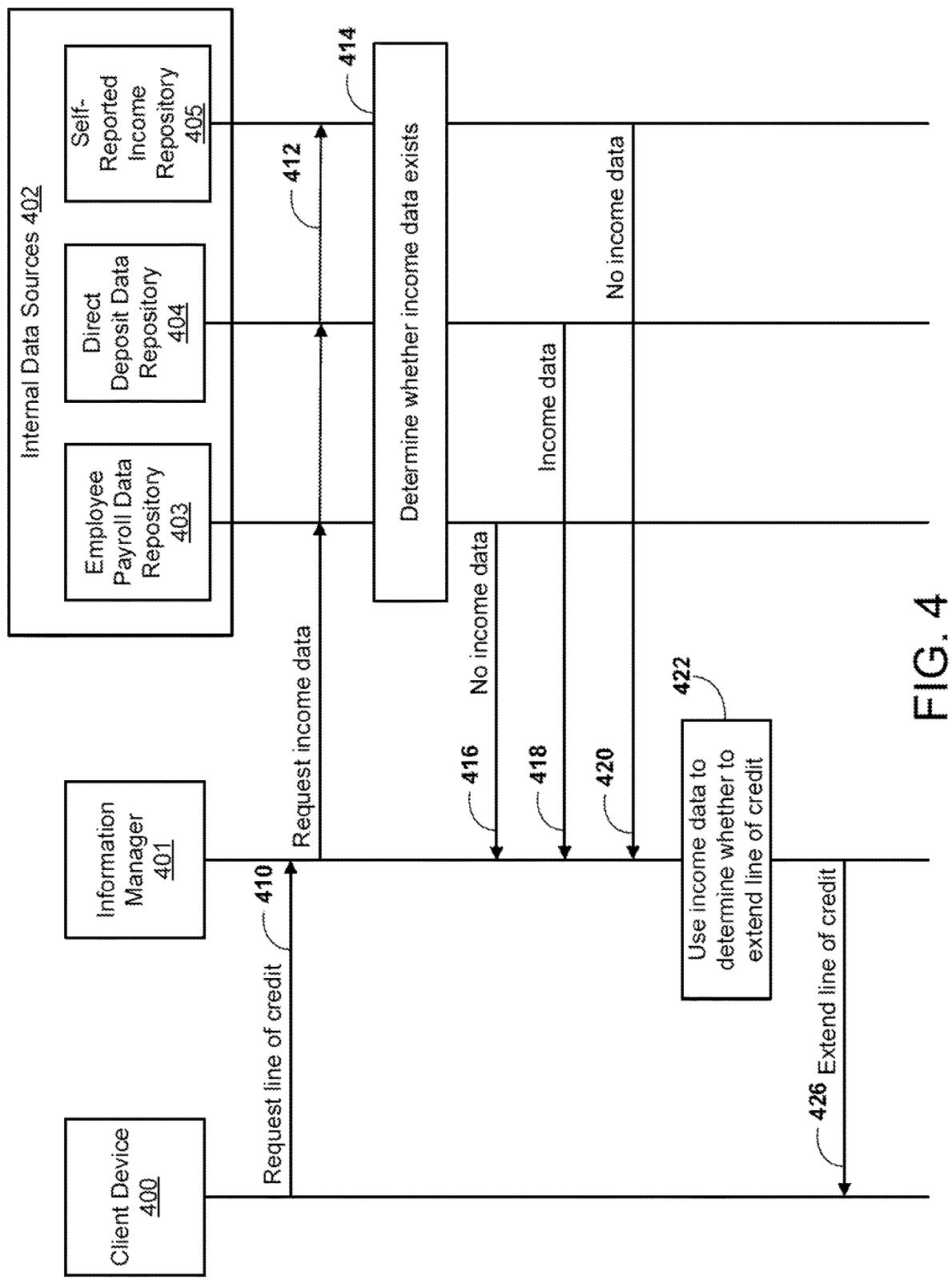

As noted above, information manager 100 may obtain data associated with a user of a client device (e.g., client device 140A) from internal data sources 110, third-party data sources 120, and/or other sources in order to provide computer-implemented services to the user of the client device. FIG. 4 shows a diagram illustrating example operations performed by components of a distributed system that may be performed when obtaining data and/or determining a preferred data source in order to obtain the data. In this figure, operations performed by a client device are shown along the line extending from the box labeled "client device 400." Similarly, operations performed by an information manager are shown along the line extending from the box labeled "information manager 401." Internal data sources 402 may include multiple data sources including employee payroll data repository 403, direct deposit data repository 404, and self-reported income repository 405. Operations performed by an employee payroll repository are shown along the line extending from the box labeled "employee payroll data repository 403," operations performed by a direct deposit data repository are shown along the line extending from the box labeled "direct deposit data repository 404," and operations performed by a self-reported income repository are shown along the line extending from the box labeled "self-reported income repository." Operations impacting two or more devices, such as data transmissions between devices, are shown using arrows extending between these lines. Generally, the operations are ordered temporally with respect to one another. However, it will be appreciated that the operations may be performed in other orders from those illustrated herein.

Turning to FIG. 4, at operation 410, client device 400 requests a line of credit from information manager 100. Receiving a request for a line of credit from client device 400 may include an authentication step in order to verify the identity of the user of client device 400. For example, information manager 401 may receive a request for a new line of credit from client device 400. In order to verify the identity of the user of client device 400, information manager 401 may perform a single-factor or multi-factor authentication process with client device 400. Client device 400 may submit a password, pin, biometric scan, etc. in order to prove the validity of the request.

Following the receipt of the request for a line of credit and a successful authentication process, information manager 401 requests income data at operation 412. The request for income data may be transmitted to each of the data sources included in internal data sources 402. Internal data sources 402 may include employee payroll data repository 403, direct deposit data repository 404, and self-reported income repository 405.

At operation 414, the employee payroll data repository 403, direct deposit data repository 404 and self-reported income repository 405 may determine whether the income data exists. The employee payroll data repository 403, direct deposit data repository 404 and self-reported income repository 405 may store income data for a variety of users and may each determine whether the requested income data exists in their storage.

At operations 416-420, the employee payroll data repository 403, direct deposit data repository 404 and self-reported income repository 405 may report back to the information manager 100 regarding the requested income data. At operation 416, the employee payroll data repository 403 does not possess the income data and may transmit a message to that effect to the information manager 401. At operation 418, the direct deposit data repository 404 does possess the income data and may transmit the income data to the information manager 401. At operation 420, the self-reported income repository does not possess the income data and may transmit a message to that effect to the information manager 401.

In this example, the information manager 401 may select the income data obtained from the direct deposit data repository 404 as the preferred source of data. However, in another embodiment, the information manager 401 may assign a data quality score to the direct deposit data repository prior to obtaining the data. The data quality score may take into account the quantity of computing resources and security risk associated with obtaining the data from the direct deposit data repository. By doing so, the information manager 401 may compare the data quality score associated with the direct deposit data repository to a data quality score associated with a third-party source and make a determination regarding where to obtain the income data. In some embodiments, the data quality score may determine the third-party source the preferred data source.

At operation 422, the information manager 401 uses the income data to determine whether to extend the line of credit to the user of the client device 400. The information manager 401 may feed the income data (and/or other data associated with the user of client device 400) into an inference model trained to make determinations regarding the financial viability of the user. In this example, the information manager 401 may determine that the line of credit should be extended to the user. As a result, at operation 426, the information manager 401 extends the line of credit to the client device 400.

As noted above, information manager 100 may obtain data associated with a user of a client device (e.g., client device 140A) from internal data sources 110, third-party data sources 120, and/or other sources in order to provide computer-implemented services to the user of the client device. After obtaining the data, the information manager 100 may provide the user with an opportunity to verify, amend, and/or supplement the data obtained without user intervention. FIGS. 5A-5D show diagrams illustrating an example implementation in which a user of a client device (e.g., client device 140A) may be applying for a line of credit.

Turning to FIG. 5A, an example of a blank credit application is shown. The blank credit application may be visible to the user of client device 140A via a graphical user interface managed by information manager 100. The fields of the form may include the name of the user, the income of the user, the list of monthly debt payments associated with the user, a list of assets associated with the user, and the number of dependents associated with the user. Information manager 100 may utilize the data obtained from internal sources (e.g., internal data sources 110), third party sources (e.g., third-party data sources 120), and/or other sources to pre-populate a sub-set of the fields without user intervention as described below.

Turning to FIG. 5B, the credit application shown in FIG. 5A is reproduced with the fields pre-populated by the information manager 100. In this example, the name of the user may be known following the previously mentioned identity verification process. The income, list of monthly debt payments, and list of assets may be obtained by the information manager 100 via the internal data sources 110, third-party data sources 120, and/or other sources. In this example, the following data may be pre-populated by the information manager 100: (annual income: $75,000; list of monthly debt payments: student loan: $200/month and car payment: $300/month; list of assets: house, vehicle). The number of dependents field may be left blank due to the information manager 100 obtaining no data related to the number of dependents associated with the user. The user may be provided with the opportunity to verify, amend, and/or supplement the pre-populated form as described below.

Turning to FIG. 5C, the credit application shown in 5B is reproduced with the addition of user input. For example, the annual income field of the form displays an amendment made by the user. The strikethrough of the $75,000 annual income represents the user marking this number as inaccurate. In addition, the user has added an updated annual income ($78,000) next to the previous number. The user has also supplemented the pre-populated data with two pieces of information not obtained by the information manager 100. First, the user has added a third monthly debt payment to the list of monthly debt payments. The mortgage payment: $1,5000/month has been added to the list. In addition, the user has added a "1" to the number of dependents field of the form. By doing so, the user has utilized the graphical user interface to interact with the pre-populated data and make modifications to the fields of the form as needed. The information manager 100 may then compile the amended data as described below.

Turning to FIG. 5D, the credit application of FIG. 5C is reproduced with the amendments made by the user integrated into the form. For example, the annual income field has been updated to reflect the number added by the user ($78,000) and the additions made by the user (to the list of monthly debt payments and number of dependents) have been integrated into the fully complete form. Following the integration of user input, the information manager 100 may utilize the data in this form to generate a data package, which may then be processed in order to make a determination regarding whether to approve or reject the credit application submitted by the user. This determination may prompt the information manager 100 to provide a computer-implemented service (e.g., extend the line of credit) to the user.

CONCLUSION

Many modifications and other embodiments of the inventions set forth herein will come to mind to one skilled in the art to which these inventions pertain having the benefit of teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also described as may be set forth in some of the appended claims. Although specific terms are employed herein, they are used in a generic and descriptive sense only and not for purposes of limitation.

What is claimed is:

1. A method for obtaining data, the method comprising:
identifying, by a data source management circuitry of an information manager, a data requirement event;
identifying, by the data source management circuitry, an internal source of data relevant to the data requirement event;
computing, by the data source management circuitry, a data quality score for the internal source of the data, wherein the data quality score is based on at least one of a computational metric or a security metric associated with the internal source of the data;
computing, by the data source management circuitry, a second data quality score for a third-party source, wherein the second data quality score is based on at least one of a computational metric or a security metric associated with the third-party source;
determining, by the data source management circuitry, an entity associated with a preferred source of data based (a) on the data quality score and (b) the second data quality score, wherein the entity is the internal source of the data or the third-party source;
obtaining, by the data source management circuitry, the data from the entity; and
providing, by a services circuitry of the information manager, computer-implemented services based on the data.

2. The method of claim 1, wherein identifying the internal source of the data comprises:
making a determination, by the data source management circuitry, that the data exists in an internal employee payroll data repository; and
selecting the internal employee payroll data repository as the internal source of the data.

3. The method of claim 1, wherein identifying the internal source of the data comprises:
making a determination, by the data source management circuitry, that the data does not exist in an internal employee payroll data repository;
based on the determination, making a second determination, by the data source management circuitry, that the data exists in a direct deposit data repository; and
selecting the direct deposit data repository as the internal source of the data.

4. The method of claim 1, wherein identifying the internal source of the data comprises:
making a determination, by the data source management circuitry, that the data does not exist in an internal employee payroll data repository;
based on the determination, making a second determination, by the data source management circuitry, that the data does not exist in a direct deposit data repository;
based on the second determination, making a third determination, by the data source management circuitry, that the data exists in a self-reported income repository; and
selecting the self-reported income repository as the internal source of the data.

5. The method of claim 1, wherein computing the data quality score for the internal source of the data comprises:
determining, by the data source management circuitry, a quantity of computing resources that will be consumed for obtaining the data from the internal source of the data; and
assigning, by the data source management circuitry, the computational metric based on the quantity of the computing resources.

6. The method of claim 5, wherein assigning the computational metric comprises multiplying the quantity of the computing resources by a weighting factor.

7. The method of claim 5, wherein computing the data quality score for the internal source of the data further comprises:
determining, by the data source management circuitry, a security ranking for the internal source of the data; and
assigning, by the data source management circuitry, the security metric based on the security ranking.

8. The method of claim 7, wherein the security ranking for the internal source of the data is higher than a security ranking of the third-party source.

9. The method of claim 1, wherein determining where to obtain the data comprises:
making a comparison, by the data source management circuitry, of the second data quality score for obtaining the data from the third-party source to the data quality score for obtaining the data from the internal source of the data;
making a determination, by the data source management circuitry and based on the comparison, that the second data quality score is lower than the data quality score; and
selecting, by the data source management circuitry, the third-party source as the preferred source of data.

10. The method of claim 1, wherein determining where to obtain the data comprises:
making a comparison, by the data source management circuitry, of the second data quality score for obtaining the data from the third-party source to the data quality score for obtaining the data from the internal source of the data;
making a determination, by the data source management circuitry and based on the comparison, that the second data quality score is higher than the data quality score; and
selecting, by the data source management circuitry, the internal source of the data as the preferred source of data.

11. An information manager for obtaining data, the information manager comprising:
a data source management circuitry configured to:
identify a data requirement event,
identify an internal source of data relevant to the data requirement event,
compute a data quality score for the internal source of the data, wherein the data quality score is based on at least one of a computational metric or a security metric associated with the internal source of the data,
compute a second data quality score for a third-party source, wherein the second data quality score is based on at least one of a computational metric or a security metric associated with the third-party source,
determine an entity associated with a preferred source of data based on (a) the data quality score and (b) the second data quality score, wherein the entity is the internal source of the data or the third-party source, and
obtain the data from the entity; and
a services circuitry of the information manager configured to provide computer-implemented services based on the data.

12. The information manager of claim 11, wherein identifying the internal source of the data comprises:

making a determination, by the data source management circuitry, that the data exists in an internal employee payroll data repository; and selecting the internal employee payroll data repository as the internal source of the data.

13. The information manager of claim 11, wherein identifying the internal source of the data comprises:

making a determination, by the data source management circuitry, that the data does not exist in an internal employee payroll data repository;

based on the determination, making a second determination, by the data source management circuitry, that the data exists in a direct deposit data repository; and selecting the direct deposit data repository as the internal source of the data.

14. The information manager of claim 11, wherein identifying the internal source of the data comprises:

making a determination, by the data source management circuitry, that the data does not exist in an internal employee payroll data repository;

based on the determination, making a second determination, by the data source management circuitry, that the data does not exist in a direct deposit data repository;

based on the second determination, making a third determination, by the data source management circuitry, that the data exists in a self-reported income repository; and selecting the self-reported income repository as the internal source of the data.

15. The information manager of claim 11, wherein computing the data quality score for the internal source of the data comprises:

determining, by the data source management circuitry, a quantity of computing resources that will be consumed for obtaining the data from the internal source of the data; and assigning, by the data source management circuitry, the computational metric based on the quantity of the computing resources.

16. The information manager of claim 15, wherein assigning the computational metric comprises multiplying the quantity of the computing resources by a weighting factor.

17. The information manager of claim 15, wherein computing the data quality score for the internal source of the data further comprises:

determining, by the data source management circuitry, a security ranking for the internal source of the data; and assigning, by the data source management circuitry, the security metric based on the security ranking.

18. The information manager of claim 17, wherein the security ranking of the internal source of the data is higher than a security ranking of the third-party source.

19. The information manager of claim 11, wherein determining where to obtain the data comprises:

making a comparison, by the data source management circuitry, of the second data quality score for obtaining the data from the third-party source to the data quality score for obtaining the data from the internal source of the data;

making a determination, by the data source management circuitry and based on the comparison, that the second data quality score is lower than the data quality score; and selecting, by the data source management circuitry, the third-party source as the preferred source of data.

20. The information manager of claim 11, wherein determining where to obtain the data comprises:

making a comparison, by the data source management circuitry, of the second data quality score for obtaining the data from the third-party source to the data quality score for obtaining the data from the internal source of the data;

making a determination, by the data source management circuitry and based on the comparison, that the second data quality score is higher than the data quality score; and selecting, by the data source management circuitry, the internal source of the data as the preferred source of data.

* * * * *